United States Patent
Strong, III et al.

[11] Patent Number: 5,755,411
[45] Date of Patent: May 26, 1998

[54] RIFLE MOUNT FOR VEHICLE AND METHOD OF UTILIZING SAME

[75] Inventors: John H. Strong, III, Miami, Fla.; Joseph Gualtier, New Castle, Wyo.; John Lee Still; Patricia Anne Fordyce, both of Punta Gorda, Fla.

[73] Assignee: Still Strong Corporation, Miami, Fla.

[21] Appl. No.: 564,512

[22] Filed: Nov. 29, 1995

[51] Int. Cl.$^6$ ............................................ B68G 5/00
[52] U.S. Cl. .................. 248/118; 248/208; 248/236; 108/44
[58] Field of Search .................. 248/118, 118.3, 248/124.1, 208, 236, 226.11, 231.31, 243, 295.11, 297.51, 352, 354.3; 42/94; 108/7, 44, 46, 147, 152; 224/561, 564, 482; 89/37.04, 37.05

[56] References Cited

U.S. PATENT DOCUMENTS

| | | | |
|---|---|---|---|
| 1,116,091 | 11/1914 | McDonald | 108/44 |
| 1,209,839 | 12/1916 | Hokenson | 248/236 |
| 1,374,907 | 4/1921 | Cofrode | |
| 1,392,092 | 9/1921 | Thompson | |
| 1,873,190 | 8/1932 | Doller | |
| 1,962,508 | 6/1934 | Josselyn | 155/198 |
| 1,964,035 | 6/1934 | Cross | 224/1 |
| 2,038,646 | 4/1936 | Ciscognetti | 155/198 |
| 2,499,103 | 2/1950 | Love | 224/42.43 |
| 2,704,224 | 3/1955 | Banks | 296/49.2 |
| 2,709,620 | 5/1955 | Tinsely et al. | 296/49.2 |
| 2,715,544 | 8/1955 | Jones | 296/49.2 |
| 2,774,641 | 12/1956 | Borders, Jr. et al. | 311/22 |
| 2,838,340 | 6/1958 | Johnson | 296/49.2 |
| 2,873,139 | 2/1959 | Borders, Jr. et al. | 296/44 |
| 2,948,565 | 8/1960 | Johnson | 296/49.2 |
| 3,129,974 | 4/1964 | Carter | 296/153 |
| 3,310,339 | 3/1967 | Stanley | 296/153 |
| 3,451,717 | 6/1969 | Carter | 296/153 |
| 3,524,678 | 8/1970 | DeLavenne | 297/216 |
| 3,601,445 | 8/1971 | Glynias | 248/118 |
| 3,625,161 | 12/1971 | Rosner | 108/44 |
| 4,592,584 | 6/1986 | White, Jr. | 296/153 |
| 4,619,386 | 10/1986 | Richardson | 108/44 |
| 4,758,043 | 7/1988 | Reynaldos | 296/153 |
| 4,869,451 | 9/1989 | Gordon | 248/236 |
| 4,950,023 | 8/1990 | Waller et al. | 296/153 |
| 5,205,606 | 4/1993 | Cassese | 296/153 |

*Primary Examiner*—Alvin C. Chin-Shue
*Assistant Examiner*—Kimberly Wood
*Attorney, Agent, or Firm*—Caesar, Rivise, Bernstein, Cohen & Pokotilow, Ltd.

[57] ABSTRACT

An apparatus for assisting in the operation of a firearm by a person from the interior of a vehicle, the vehicle including a door having and interior and exterior surface and a retractable window therebetween. The apparatus includes in a first embodiment, a shooting platform having of a generally horizontal first support surface, a generally horizontal second support surface located above the first support surface and an inclined support surface therebetween. The shooting platform is supported by a support member extending downwardly from the shooting platform and resting on the exterior surface of the vehicle door. The apparatus is releasably mounted on the retractable window by a pair of opposed walls which engage the retractable window therebetween. The shooting platform is adjusted by a retractable post. The invention further includes another apparatus to aid in shooting a firearm while outside the vehicle. That apparatus includes an adjustable table and a vertical post which extends downwardly from the adjustable table. The post is connected to a horizontal connecting post generally perpendicular thereto. An adjustable seat is connected to the vertical post.

8 Claims, 7 Drawing Sheets

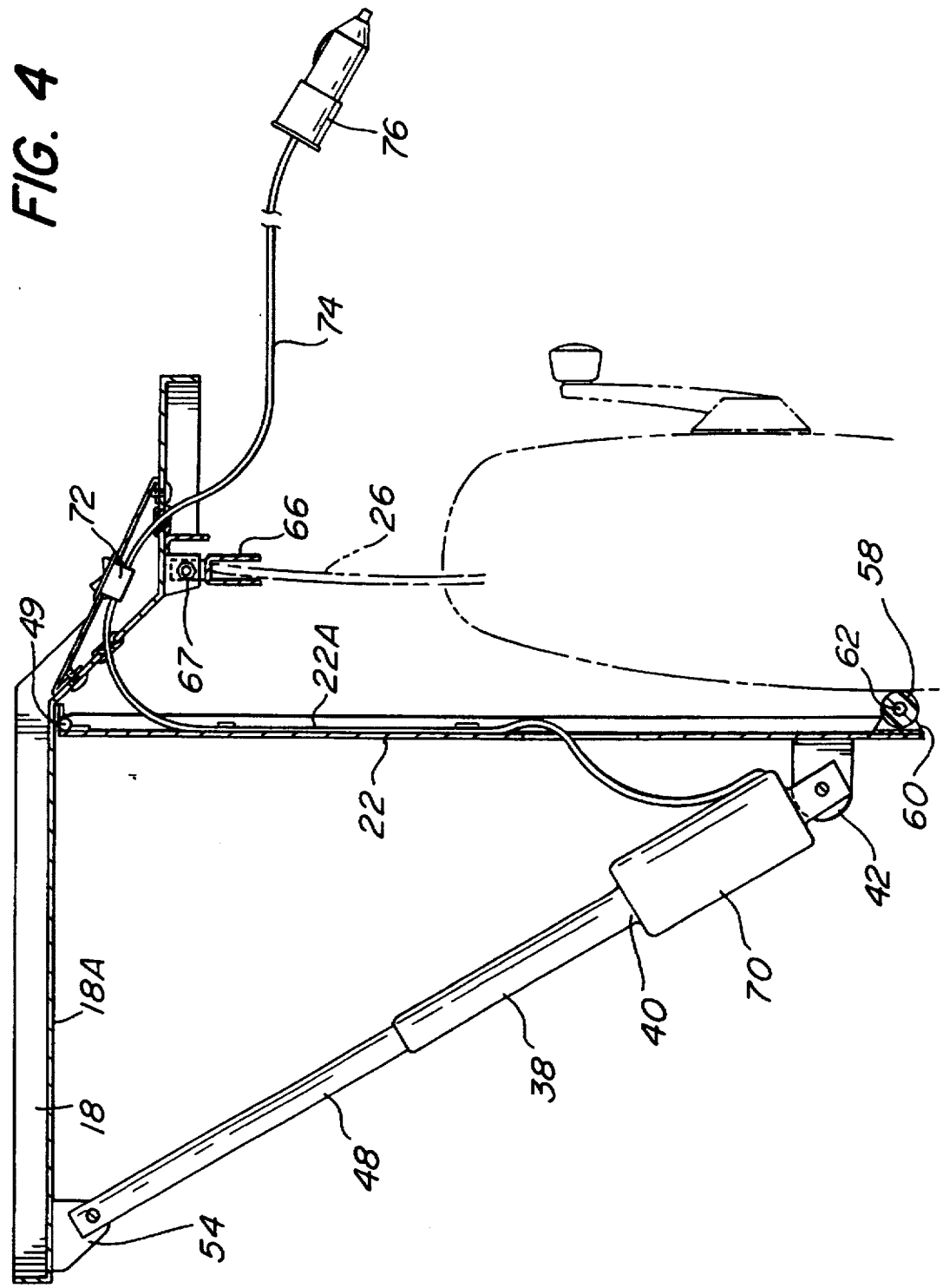

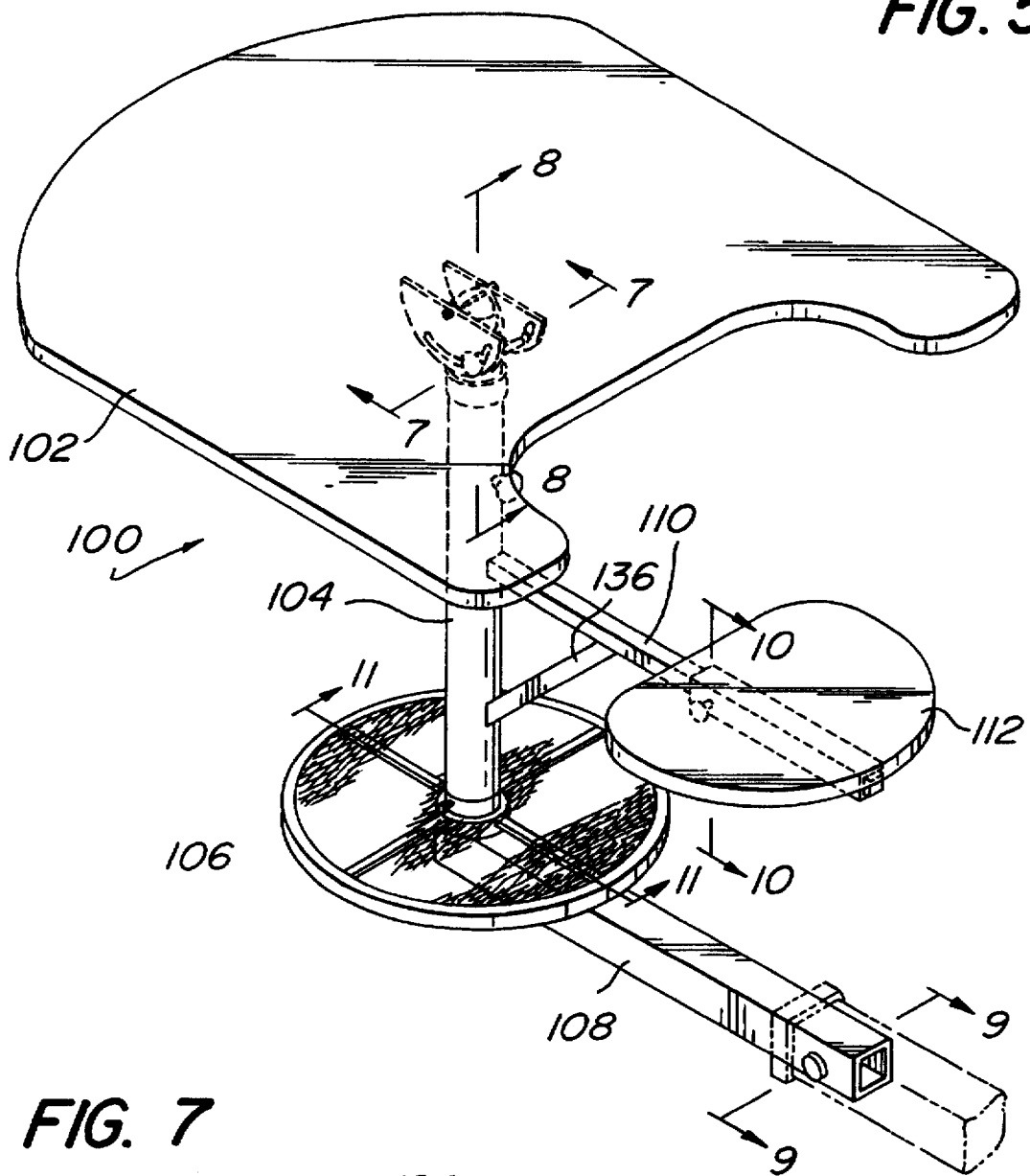
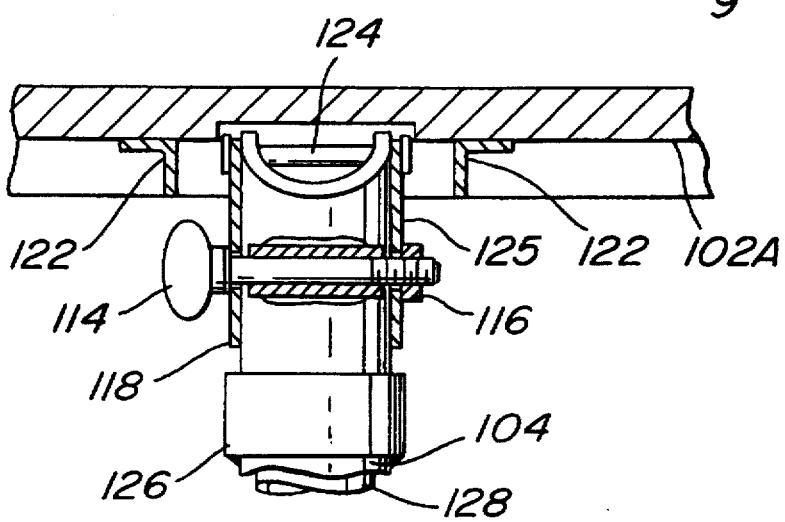

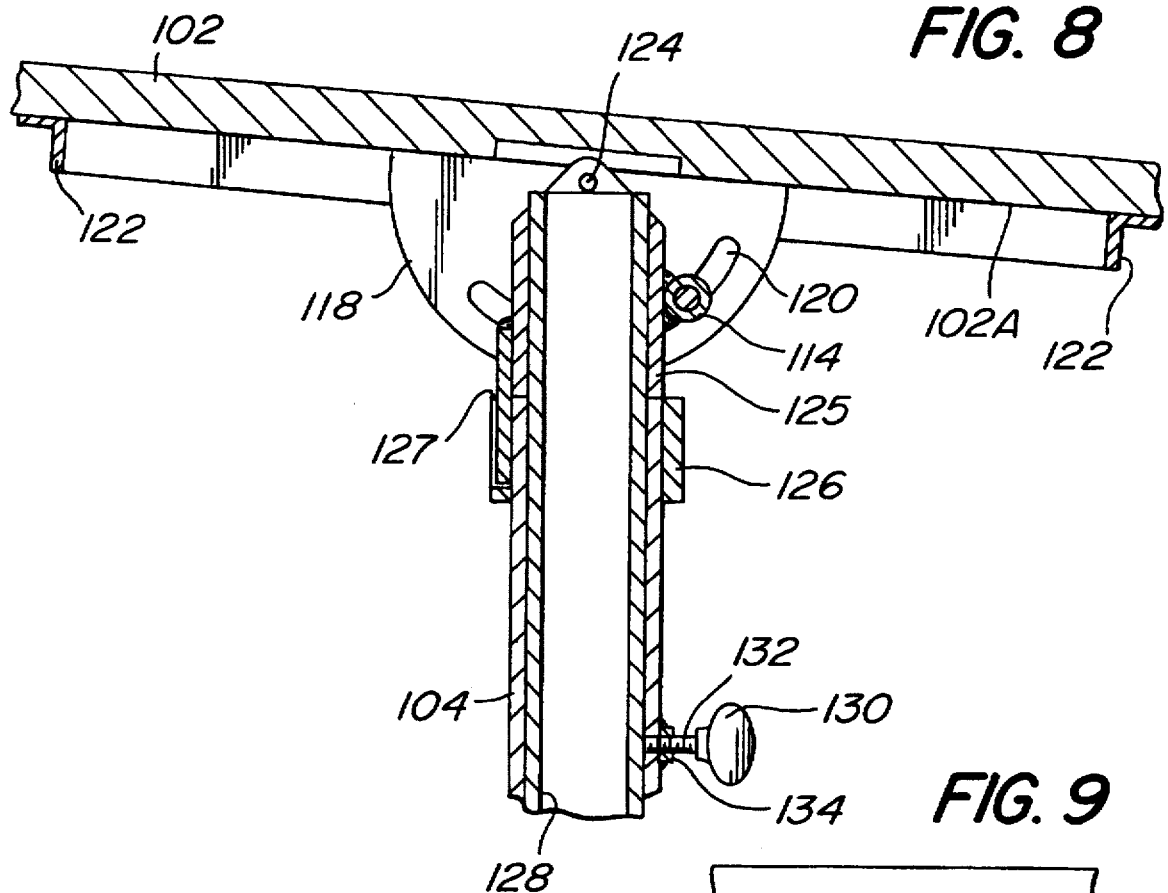
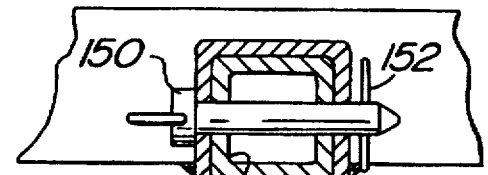
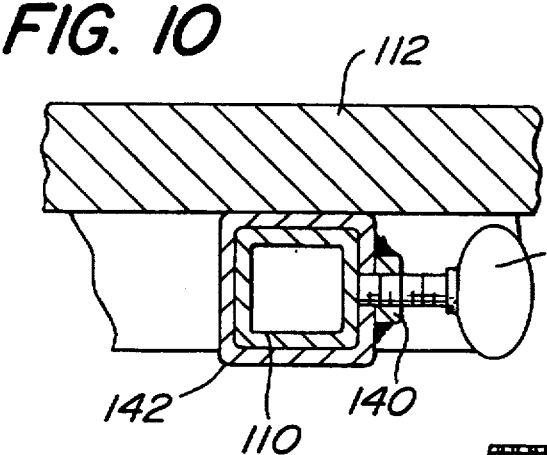
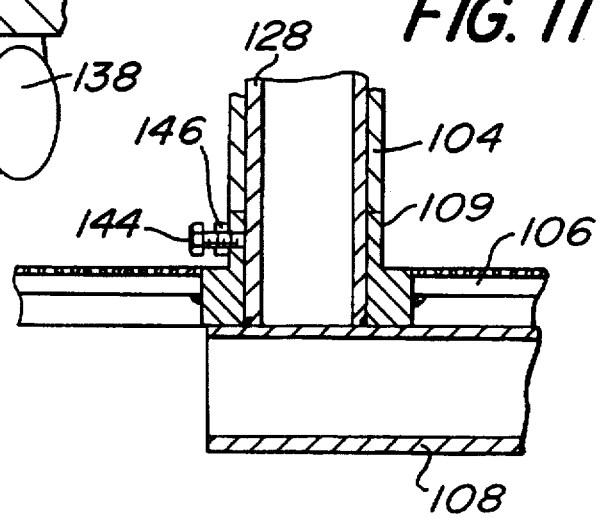

RIFLE MOUNT FOR VEHICLE AND METHOD OF UTILIZING SAME

BACKGROUND OF THE INVENTION

The present invention is directed to a rifle mount for a vehicle and method of utilizing the same. Game hunting in the wild often subjects the hunter to a wide variety of weather conditions and terrain which often times makes it difficult or impossible to accurately shoot a fire arm such as a rifle at the target. Due to these conditions a hunter may not gain the proper foothold to discharge the firearm in the intended direction. Thus, the present invention is directed to alleviating many of the problems encountered by hunters in such conditions.

One way which the present invention achieves those goals is to enable the hunter to discharge the firearm from the interior of a vehicle such as a pickup truck, etc. The present invention achieves this by providing the hunter with an adjustable shooting platform which can be used while still in the vehicle. In another embodiment of the invention, the adjustable shooting platform includes an adjustable seat and the device is to be used outside of the vehicle.

Platforms or arm rests to be used with motor vehicles are well known in the art however none of the prior art know to date appear to show or suggest an adjustable shooting platform to enable a hunter to shoot a fire arm while seated in the interior of a motor vehicle.

Prior art devices include that shown in U.S. Pat. No. 2,715,544 (Jones) which discloses an armrest attached to the top edge of a window of a car which extends on both sides of the window. U.S. Pat. No. 4,592,584 (White, Jr.) discloses an armrest device with a brace which fits against the side of a door of a car. U.S. Pat. No. 2,774,641 and U.S. Pat. No. 2,873,139 (Borders, Jr., et al.) disclose a serving tray with braces which fit against the door frame of a car. U.S. Pat. No. 1,964,035 (Cross) discloses a holster holder attached to the floor shift of a vehicle for holding a pistol.

Other patents which show armrests which fit to doors or the tops of windows include U.S. Pat. No. 2,838,340 (Johnson), U.S. Pat. No. 1,374,907 (Cofrode), U.S. Pat. No. 1,962,508 (Josselyn) and U.S. Pat. No. 2,704,224. Several of the devices shown in these patents are foldable and portable.

U.S. Pat. No. 2,704,224 (Banks) and U.S. Pat. No. 2,838,340 (Johnson) disclose armrests with substantially flat platforms that fit to the tops of windows. U.S. Pat. No. 4,592,584 (White) and U.S. Pat. No. 2,774,641 and U.S. Pat. No. 2,873,139 (Borders, Jr., et al.) disclose devices with flat platforms which fit on the doors of cars which are braced to the side of the cars.

Other patents of interest include U.S. Pat. No. 1,374,907 (Cofrode), U.S. Pat. No. 1,392,092 (Thompson), U.S. Pat. No. 1,873,190 (Doller), U.S. Pat. No. 1,962,508 (Josselyn), U.S. Pat. No. 2,038,646 (Ciscognetti), U.S. Pat. No. 2,499,103 (Love), U.S. Pat. No. 2,704,224 (Banks), U.S. Pat. No. 2,709,620 (Tinsely, et al.), U.S. Pat. No. 2,838,340 (Johnson), U.S. Pat. No. 2,948,565 (Johnson), U.S. Pat. No. 3,129,974 (Carter), U.S. Pat. No. 3,310,339 (Stanley), U.S. Pat. No. 3,451,717 (Carter), U.S. Pat. No. 3,524,678 (DeLavenne), U.S. Pat. No. 4,758,043 (Reynaldos), U.S. Pat. No. 4,950,023 (Waller, et al.), and U.S. Pat. No. 5,205,606 (Cassese).

Accordingly, a need exists for an adjustable shooting platform which enables a hunter to shoot a firearm while still within the vehicle.

SUMMARY OF THE INVENTION

These and other objects of this invention are achieved by providing an apparatus for assisting in the operation of a firearm by a person from the interior of a vehicle. The apparatus includes a shooting platform having of a generally horizontal first support surface, a generally horizontal second support surface located above the first support surface and an inclined support surface therebetween. The shooting platform is supported by a support member extending downwardly from the shooting platform and resting on the exterior surface of the vehicle door. The apparatus is releasably mounted on the window of the vehicle by a pair of opposed walls which engage the window therebetween. The shooting platform is adjustable by a retractable post extending from the shooting platform to the downwardly extending support member and may be motorized or manually adjusted. The method of the prevent invention permits a person to shoot a firearm from the interior of a vehicle by utilizing this apparatus The invention further includes another apparatus for assisting in the shooting of a firearm from the exterior of a vehicle. This apparatus includes an adjustable table and a vertical post which extends downwardly from the adjustable table. The vertical post is connected to a connecting post which extends outwardly from the vertical post and generally perpendicular thereto. An adjustable seat is also connected to the vertical post.

DESCRIPTION OF THE DRAWINGS

Other objects and many attendant features of this invention will become readily appreciated as the same becomes better understood by reference to the following detailed description when considered in connection with the accompanying drawings wherein:

FIG. 4 is an enlarged sectional view of a second embodiment of the rifle mount for a vehicle as mounted on a vehicle door, similar to FIG. 3, but utilizing a hand actuated motor to rifle mount with respect to the vehicle.

FIG. 5 is a perspective, partially in phantom, view of a third embodiment of a rifle mount of the present invention which can be mounted at the rear of a vehicle, such as to a trailer hitch.

FIG. 7 is an enlarged sectional view of the device of FIG. 5 taken along lines 7—7 thereof showing the table angle adjusting mechanism of the rifle mount.

FIG. 8 is an enlarged sectional view of the device of FIG. 5 taken along lines 8—8 thereof showing the adjustment mechanism to adjust the vertical height of the rifle mount of the present invention with respect to the ground.

FIG. 9 is an enlarged sectional view of the device of FIG. 5 taken along lines 9—9 thereof showing the mechanism to mount the rifle mount to a trailer hitch shown partially in phantom.

FIG. 10 is an enlarged sectional view of the device of FIG. 5 taken along lines 10—10 thereof showing the seat adjusting mechanism of the rifle mount.

FIG. 11 is an enlarged sectional view of the device of FIG. 5 taken along lines 11—11 thereof showing the rifle mount rotatable platform.

DETAILED DESCRIPTION OF THE PREFERRED EMBODIMENTS

Figure 1:
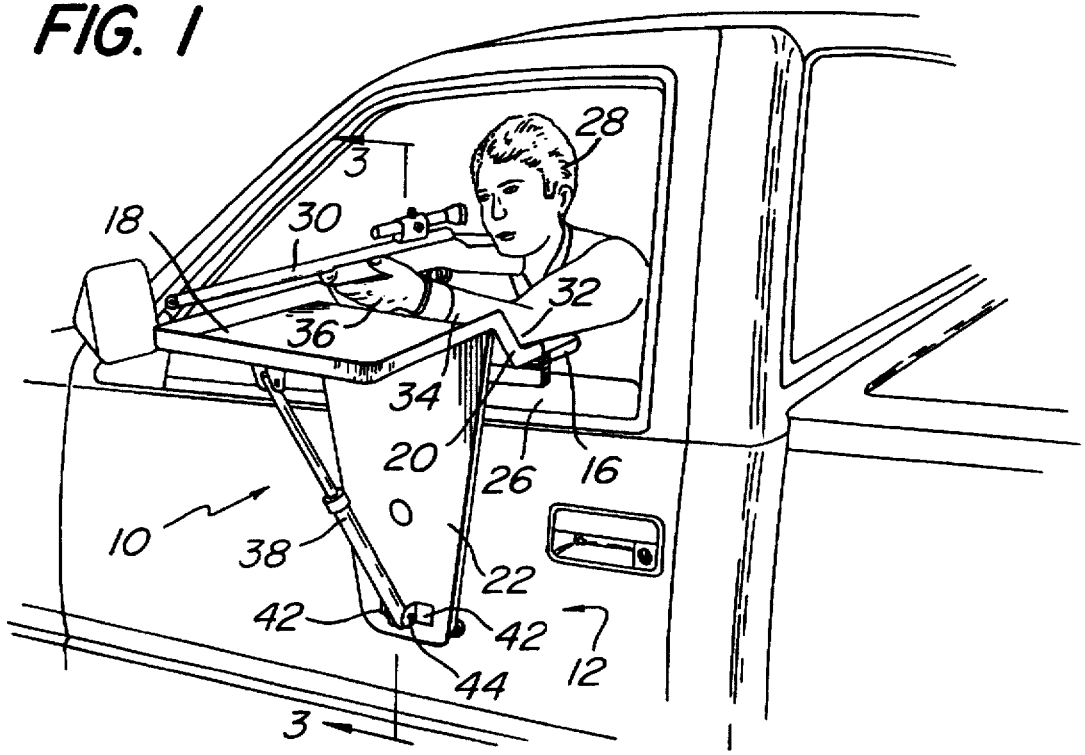
FIG. 1 is a perspective view of the rifle mount for a vehicle shown mounted on a door of a vehicle.
Figure 1A:
FIG. 1A is a perspective view of the rifle mount for a vehicle shown mounted on an opened door of a vehicle with the user shown standing.

Referring now to various figures of the drawings where like reference numerals refer to like parts, there is shown in FIGS. 1 and 1A, a device 10 constructed in accordance with this invention mounted on the door 12 of a vehicle 14.

Briefly, the device 10 includes a first horizontal surface 16, a second horizontal surface 18 and an inclined surface 20 therebetween. The device 10 further includes a generally vertical panel 22 and an adjustable brace 24 secured to the horizontal surface 18 and the vertical panel 22. After the device 10 is mounted on the vehicle door 12 and/or window 26 one can adjust the brace 24 to angle the surfaces 18 and 16 to the desired angle with respect to the ground. One may also adjust the height of the vehicle window 26 with the device 10 mounted thereon, to a comfortable height for shooting.

As shown in FIG. 1, a person 28 located within the vehicle 14 can aim and/or shoot a firearm 30 (e.g., the rifle shown) with greater ease, security and accuracy by utilizing the present invention. For example, once the rifle mount 10 is mounted on a vehicle door 12, one may rest their elbow 32 on the first horizontal surface 16 so that their forearm 34 is adjacent the inclined surface 20 and their hand 36 either rests on or is adjacent the second horizontal surface 18. If desired, the vehicle window 26 can be lowered or raised as necessary to adjust the height of the surfaces 16 and 18. In addition, the angle of surfaces 16 and 18 with respect to the ground can be adjusted by manually adjusting the adjustable brace 24 prior to mounting the device 10 on the vehicle door 12, as described in further detail below.

Alternatively, as shown in FIG. 1A, the person 28 may stand outside the vehicle with the door 12 open to aim and/or shoot the firearm 30 as desired.

Figure 2:
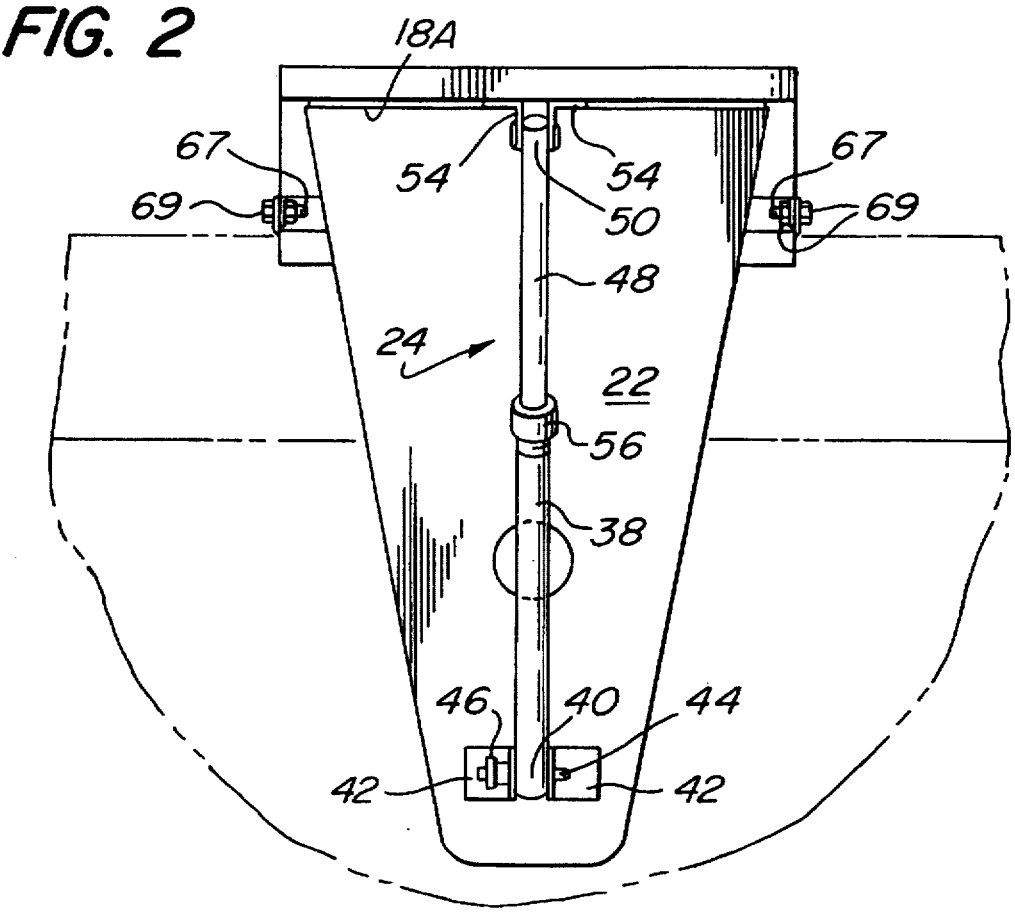
FIG. 2 is an enlarged front view of the rifle mount for a vehicle with the vehicle door shown in phantom.

As shown in FIG. 2, the adjustable brace 24 includes a lower rod 38 having a distal end 40. The distal end 40 is pivotally secured to the panel 22 via brackets 42. The brackets 42 are fixedly secured to vertical panel 22 via a conventional nut 44 and bolt 46. The lower rod 38 acts as a receptacle for the upper rod 48 which telescopes into the lower rod 38. This telescoping feature permits the adjustment of the horizontal surfaces 16 and 18 as described herein. The upper rod 48, like the lower rod 38, is also pivotally secured at its distal end 50 using brackets 54 which are fixedly secured to the lower surface 18A of horizontal surface 18. The upper rod 48 is pivotally secured to the brackets 54 by a conventional nut and bolt. Alternatively, one may also use a conventional pin in place of the nut and bolt arrangement.

Figure 3:
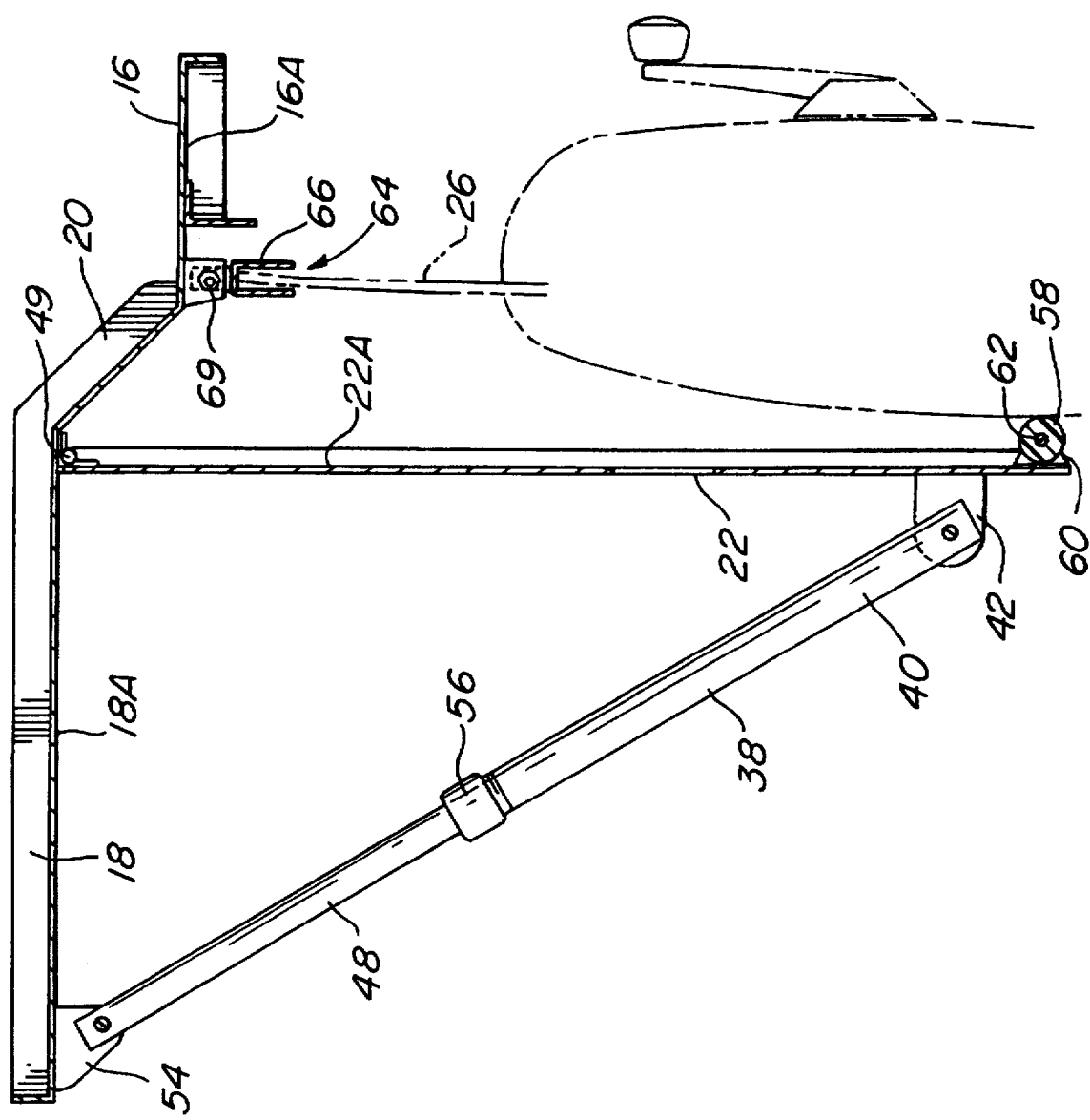
FIG. 3 is an enlarged sectional view of the rifle mount for a vehicle as mounted on a vehicle door, taken along lines 3—3 of FIG. 1, with the vehicle interior shown partially in phantom.

The telescoping lower rod 38 and the upper rod 48 are maintained in their desired orientation by adjusting a conventional frictional fitting member 56 therebetween as shown in FIG. 3, which can be adjusted by rotating the member 56 in either direction to increase or decrease the tension the member 56 exerts on the lower rod 38 and the upper rod 48. As the brace 24 is adjusted, the horizontal surfaces 16 and 18 will move via hinge 49 which is secured to the lower surface 18A and to the rear surface 22A of support member 22.

In order to prevent marring of the vehicle door 12 by the panel 22 of the device 10, as shown in FIG. 3, the rear surface 22A of panel 22 may include one or more rollers 58 which are rotationally secured to the rear surface 22A by brackets 60. The roller 58 rotates about pin 62 as the device 10 is lowered or raised by lowering or raising the vehicle window 26. Preferably, the rollers 58 are made of a non-marring material such as rubber or plastic, to prevent the painted surface of the vehicle door 12 from being damaged as the device 10 is adjusted to the appropriate height.

To assist in mounting the device 10 on the vehicle 14, as shown in FIG. 3, the device 10 includes a window engaging slot 64. The slot 64 is of a sufficient width to permit a vehicle window 26 (shown in phantom) to fit therein and includes a generally U-shaped member 66 rotatably secured at its end via a nut or pin not shown to the lower surface 16A of the first horizontal surface 16. The nut or pin has one or more conventional bolts (not shown) at each end to secure the pin so that the member 66 is properly rotatable thereabout. By placing the device 10 so that the vehicle window 26 is in slot 64 and then raising or lowering the window 26 by manually rotating the handle shown in phantom (or by using the mechanism of an electric window) one can adjust the height of surfaces 16 and 18.

In a second embodiment of the invention shown in FIG. 4, the rifle mount is similar to that shown in FIG. 1, but also includes a conventional motor system 70 to adjust the adjustable brace 24. The motor system 70 adjusts the lengths of the lower rod 38 and upper rod 48 with respect to one another, thus adjusting the angle of horizontal surfaces 16 and 18 with respect to the user 28. The motor system 70 can be actuated by a conventional switch 72 which may be located, for example, on inclined panel 20. The motor 70 is electrically connected to a power source (not shown) such as a conventional car battery (not shown) by a cable 76 having at its end a converter 76 which is inserted into a conventional cigarette lighter (not shown) in the vehicle 14. Alternatively, the motor system 70 may be driven by a conventional separate battery source also not shown.

The various components of the device 10 can be made of any resilient material capable of functioning for the intended purposes. Examples of such materials include steel, resilient plastics, etc.

Figure 6:
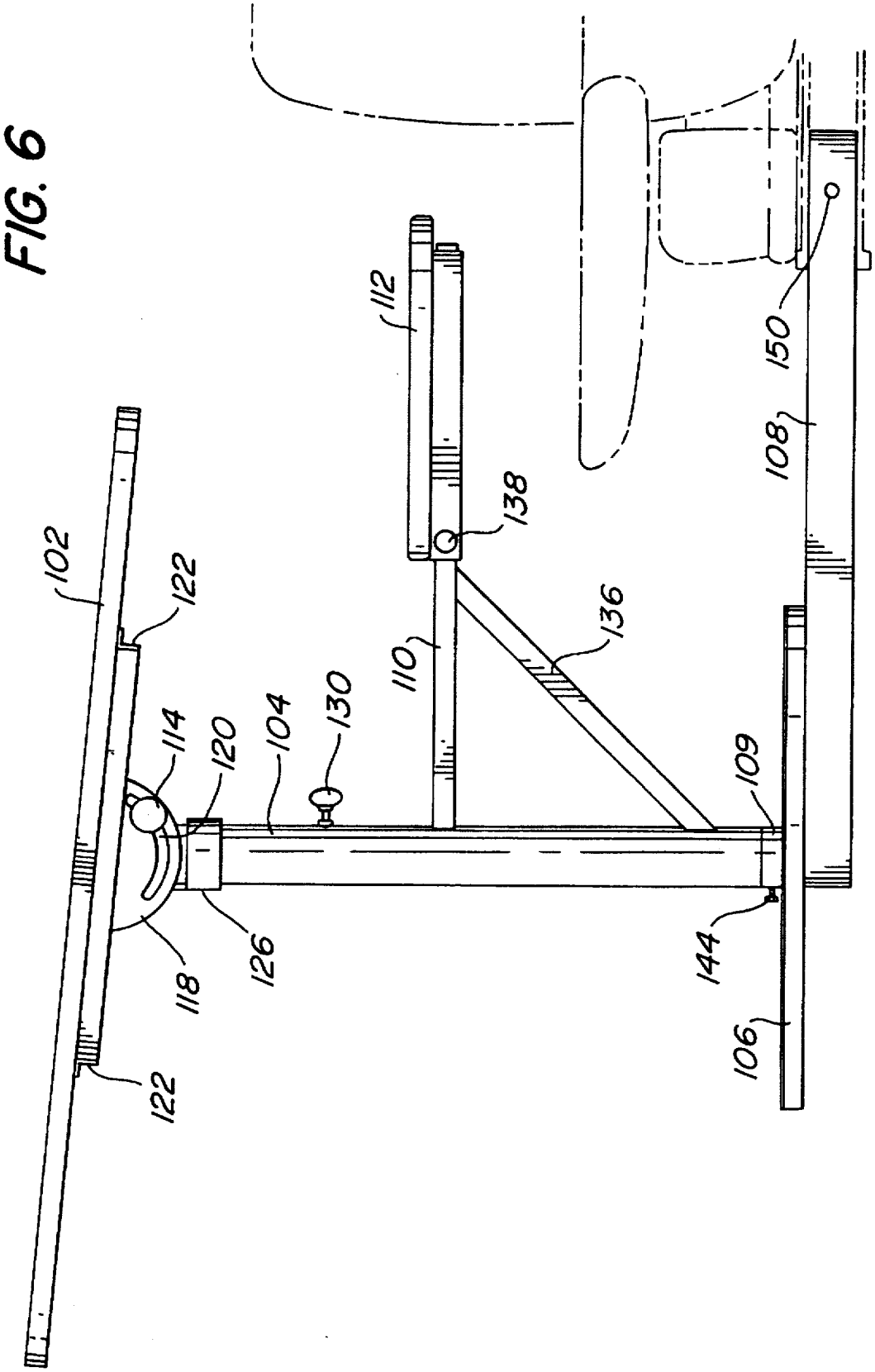
FIG. 6 is a side elevational view, partially in phantom of the device of FIG. 5 shown attached to a trailer hitch secured to the rear of a pickup truck with its load door in the open position all shown in phantom.

Another embodiment 100 of the rifle mount of the present invention is shown in FIGS. 5–11. FIG. 6 shows the device 100 as mounted to a conventional trailer hitch (in phantom) which may be secured to the rear of a pickup truck with its cargo door in a down position, also shown in phantom.

As shown in FIG. 5, the device 100 includes an adjustable table 102 which is secured to an adjustable telescoping vertical post 104. The table 102 contains a cutaway portion enabling a person to lean forward on the table as desired. At the base of the vertical post 104 is a footrest 106. As described in more detail below, a connecting rod 108 is secured to the device and a conventional trailer hitch shown in phantom. Extending outwardly from the vertical post 104 in a generally horizontal direction is seat support rod 110. An adjustable seat 112 slidingly engages seat support rod 110 as described in further detail below. One can adjust the table 102 and seat to their desired positions to permit a person to sit on the seat 112 and rest their arm and/or other body portion on the table 102 for securement in shooting a fire arm such as a rifle (not shown).

As shown in FIGS. 6 and 7, the angle of the table 102 with respect to the seat 112 is adjustable and the table 102 is capable of rotation about the longitudinal axis of the vertical post 104 when desired. To adjust the horizontal angle of the table 102 relative to the footrest 106, a conventional threaded wing bolt 114 is loosened from its cooperatively threaded conventional nut 116. The wing bolt 114 extends through and frictionally engages the brackets 118 and the vertical post 104 therebetween. The brackets 118 are fixedly secured in a conventional manner, (e.g., welded, etc.) to the underside 102A of table 102. Braces 122 are also fixedly secured to the underside 102A of the table 102 to provide support thereto. The brackets 118 each contain an arcuate channel 120 permitting the arcuate adjustment of the table 102 relative to the seat 112 as the bolt 114 passes through the arcuate channel.

As one adjusts the horizontal angle of the table 102, as shown in FIGS. 7 and 8, the table 102 will pivot about a conventional pivot pin 124 (FIG. 7). The pivot pin 124 passes through opposed openings in an upper collar 125. The upper collar 125 is fixed secured (e.g., welded) to the exterior surface of inner post 128 by a weld. The lower end of inner post 128 is fixedly secured to connecting post 108 (FIG. 11) as described in further detail below. The pin 124 also passes through opposed openings in the inner post 128 (FIG. 7) and is secured by conventional means. When one wishes to place the table 102 onto the internal post 128, the table 102 and upper collar 125 unit are placed over the internal post 128 so that the internal post 128 is placed within the upper collar 125 and through the vertical post 104. The upper collar 125 thus fits within a slot 127 defined by the collar 126 and the vertical post 104 as shown in FIG. 8 to prevent the table 102 from rotating about the vertical post 104 via a frictional fit.

As shown in FIG. 8, the fixed inner post 128 fits within the vertical post 104. The two posts 104 and 128 are of sufficient and cooperative diameters to permit the internal post 128 to fit within the vertical post 104. The vertical post 104 also has a collar 126 fixedly secured to the vertical post 104 at its upper end. The upper collar 125 welded to the inner post 128 rests on the collar 126 in slot 127. As described in further detail below, when the seat 112 and vertical post 104 are rotated about the fixed internal post 128, the collars 125 and 126 act in a cooperative fashion.

Rotation of the vertical post 104 with respect to the fixed internal post 128 can be prevented until desired, by the use of a conventional threaded bolt 130 (FIG. 8). In FIG. 8 is shown a conventional threaded pressure wing bolt 130 having threads 132. The threads 132 of the pressure wing bolt 130 are threaded through a set 134 which is fixedly secured to the exterior of vertical post 104. The bolt 130 then passes through the post 104 itself. The wing bolt 130 then engages the exterior surface of the internal post 128 and applies pressure thereto to prevent the vertical post 104 from moving with respect to the fixed internal post 128 until desired.

In a similar fashion, as shown in FIG. 11, rotation of the footrest 106 about the fixed internal post 128 is also accomplished with a threaded bolt 144. To secure the footrest 106 from rotating about the internal post 128 a conventional threaded bolt 144 extends through a cooperatively threaded set 146. The set 146 is fixedly secured to the exterior of a collar 109 which is fixedly secured to the footrest 106. The collar 109 (and thus the footrest) rotates about the internal post 128 which is fixedly secured to connecting rod 108. The bolt 144 passes through the collar 109 to the internal post 128 and exerts pressure thereon to prevent the footrest 106 from rotating until desired. In addition, FIG. 11 shows that the vertical post 104 rests on collar 109 when the device 100 is assembled.

The footrest 106 permits the user to rest their feet while sitting on the seat 112. The footrest 106 is shown to be made of a mesh-type material, e.g., steel, aluminum, etc., to permit water, mud, etc., which may be on the user's feet, although any suitable material may be used.

As shown in FIG. 5, the adjustable seat 112 is secured to horizontal post 110 which is fixedly secured to vertical post 104. A support post 126 is fixedly secured (e.g., by welding) to both the horizontal post 110 and vertical post 104 to provide support for the seat 112 and person sitting thereon, the strut 136 (FIG. 6) also provides support for section 112. As shown in FIG. 10, to adjust the distance of the seat 112 from the vertical post 104 and table 102, a conventional threaded wing nut 138 is adjusted. The wing nut 138 is threaded through cooperatively threaded set 140 and extends through an external post 142 which telescopes with horizontal post 110. When the wing nut 138 is untightened it relieves the pressure that the wing nut 138 exerts on the horizontal post 110. Thus, the seat 112 may then be moved toward or away from the table 102 as desired. When the desired seat location is achieved one need merely tighten the wing nut 138 to frictionally engage the horizontal post 110.

The rifle mount 100 can be easily attached to a conventional trailer hitch secured to a vehicle such as a pickup truck as shown in FIGS. 5 and 9. While connected to the trailer hitch, if one wishes to move the rifle mount 100 while it is attached to the vehicle, one can easily do so by merely moving the vehicle to the desired location.

As shown in FIG. 9, the connecting post 108 telescopes with and is releasably secured to trailer hitch post 148 by pin 150. The pin 150 is secured through the posts 108 and 148 by stop member 152 which extends through the pin once in place. To release the rifle mount 100 from the trailer hitch post 148 the stop member 152 and pin are removed and the posts 108 and 148 are separated. The rifle mount 100 can then be easily moved to a desired location for storage, etc.

The rifle mount 100 may be comprised of any suitable material, e.g., steel, aluminum, etc. and its various components may be welded, bolted or secured as desired by conventional means.

When utilizing the rifle mount 100, a person sits on the seat 112 and may lean on the table 102 with his or her arms and or body in a comfortable position. This combination of features provides support for the person, thus making shooting a firearm such as a rifle easier and more comfortable. In addition, the added stability of the rifle mount 100 improves a person's accuracy in shooting, especially in circumstances such as in the wild, where support for shooting a firearm may not be easily found. The hunter utilizing the rifle mount 100 of the present invention thus has a relatively controlled shooting environment and can adjust the device in accordance with the various circumstances of use.

Without further elaboration the foregoing will so fully illustrate our invention that others may, by applying current or future knowledge, adapt the same for use under various conditions of service.

We claim:

1. A rifle mount for a vehicle comprised of an apparatus in combination with said vehicle, said apparatus assisting in the operation of a firearm by a person positioned in the vehicle, the vehicle comprising a door having an interior and an exterior surface and a retractable window therebetween, the apparatus comprising:

(a) a shooting platform comprised of a generally horizontal first support surface, a generally horizontal second support surface located above the first support surface and an inclined support surface therebetween;

(b) means supporting the shooting platform comprising a support member extending downwardly from the shooting platform and resting on the exterior surface of the vehicle door;

(c) means releasably mounting the apparatus on the retractable window, the releasable mounting means comprising a pair of opposed walls to engage the retractable window therebetween; and (d) means adjusting the shooting platform comprising a retractable post extending from the generally horizontal second support surface of the shooting platform to the downwardly extending support member and a means extending the retractable post.

2. The apparatus of claim 1 wherein the first support surface, second support surface and inclined support surface are integral.

3. The apparatus of claim 1 wherein the support member comprises a panel which extends downwardly from the shooting platform adjacent the exterior surface of the vehicle door.

4. The apparatus of claim 3 wherein the support member additionally comprises a means preventing marring of the exterior surface of the vehicle door by the support member.

5. The apparatus of claim 4 wherein the means preventing marring of the exterior surface of the vehicle door by the support member comprises a roller rotatingly secured to the panel which engages the exterior surface of the vehicle door.

6. The apparatus of claim 1 wherein the shooting platform comprises an upper and lower surface and the pair of opposed walls to engage the retractable window therebetween are secured to the lower surface of the shooting platform.

7. The apparatus of claim 1 wherein the retractable post extending from the generally horizontal second support surface of the shooting platform to the downwardly extending support member comprises a first and second post, the first and second posts being in telescopic relationship to one another, the first post being adjustably secured to the support member and the second post being adjustably secured to the generally horizontal second support surface.

8. The apparatus of claim 7 wherein the means extending the retractable post comprises a motor connected to the first post.

* * * * *